US008849609B2

(12) United States Patent
Kawabe

(10) Patent No.: US 8,849,609 B2
(45) Date of Patent: Sep. 30, 2014

(54) NUMBER-OF-STEP DETECTION SYSTEM, NUMBER-OF-STEP DETECTING METHOD, AND ACTIVITY METER

(75) Inventor: Yusuke Kawabe, Kyoto (JP)

(73) Assignee: Omron Healthcare Co., Ltd., Kyoto (JP)

(*) Notice: Subject to any disclaimer, the term of this patent is extended or adjusted under 35 U.S.C. 154(b) by 692 days.

(21) Appl. No.: 13/149,366

(22) Filed: May 31, 2011

(65) Prior Publication Data

US 2011/0231152 A1    Sep. 22, 2011

Related U.S. Application Data

(63) Continuation of application No. PCT/JP2009/007222, filed on Dec. 25, 2009.

(30) Foreign Application Priority Data

Dec. 26, 2008    (JP) ............................... 2008-333402

(51) Int. Cl.
    *G01C 22/00*    (2006.01)
    *A61B 5/103*    (2006.01)
    *G01G 19/50*    (2006.01)
    *G01G 23/16*    (2006.01)

(52) U.S. Cl.
    CPC ............... *G01G 19/50* (2013.01); *G01G 23/16* (2013.01)
    USPC .................................. 702/160; 600/595

(58) Field of Classification Search
    CPC ...... A61B 5/11; A61B 5/1116; A61B 5/1122; G01C 22/006
    USPC ......... 702/160, 127, 141, 149, 158, 187, 189; 600/595; 73/1.37–1.38, 1.82, 488, 490, 73/492, 514.01, 514.15
    See application file for complete search history.

(56) References Cited

U.S. PATENT DOCUMENTS

| 2007/0143069 A1* | 6/2007 | Pasolini et al. ............... 702/160 |
| 2009/0240461 A1 | 9/2009 | Makino et al. |

FOREIGN PATENT DOCUMENTS

| CN | 101147674 A | 3/2008 |
| JP | A-2002-360549 | 12/2002 |
| JP | A-2003-290175 | 10/2003 |
| JP | A-2007-244495 | 9/2007 |

OTHER PUBLICATIONS

Jun. 3, 2013 Office Action issued in Chinese Patent Application No. 200980152934.4 (with translation).
International Search Report for International Patent Application No. PCT/JP2009/007222, mailed on Apr. 6, 2010 (w/ English translation).

* cited by examiner

*Primary Examiner* — Toan Le
(74) *Attorney, Agent, or Firm* — Oliff PLC

(57) ABSTRACT

An object of the present invention is to provide a number-of-step detection system, a number-of-step detecting method, and a pedometer capable of accurately detecting the number of steps in correspondence with the walking characteristics of an individual.

Vibration data acquired with a vibration data acquiring unit of a pedometer is transmitted from the pedometer to a server with a communication unit, and number-of-step decision criterion data suited for measuring the number of steps is calculated with the calculation unit of the server based on the vibration data. The number-of-step decision criterion data calculated in the server is transmitted from the server to the pedometer, and the number-of-step decision criterion data stored in the pedometer is updated to the number-of-step decision criterion data calculated by the server to accurately count the number of steps in correspondence with the walking characteristics of the individual.

10 Claims, 6 Drawing Sheets

NUMBER-OF-STEP DETECTION SYSTEM, NUMBER-OF-STEP DETECTING METHOD, AND ACTIVITY METER

This is a Continuation of International Application No. PCT/JP2009/007222 filed Dec. 25, 2009, which claims the benefit of Japanese Patent Application No. 2008-333402 filed Dec. 26, 2008. The disclosures of the prior applications are hereby incorporated by reference herein in their entireties.

TECHNICAL FIELD

The present invention relates to a number-of-step detection system, a number-of-step detecting method, and an activity meter used when accurately detecting number of steps in correspondence with the walking characteristics of an individual.

BACKGROUND ART

A pedometer for detecting the number of steps using an acceleration sensor is conventionally proposed. Such pedometer detects one step from a local maximal value and a local minimal value of an acceleration waveform, and counts the number of steps. However, there are cases where the number of steps is difficult to be detected depending on the walking characteristics of the user such as when shuffling due to injury, and the like.

A body condition detection device and a program of patent document 1 propose a meter for measuring the number of steps of the user. Such document describes obtaining the walking mode such as normal walking, hurrying step, running, and the like from the difference in amplitude and waveform pattern of a signal waveform Sw, and detecting the walking pitch of the user stably and at high accuracy. Although the difference in the walking mode can be detected with the body condition detection device of patent document 1, however, the number of steps of the individual user cannot be accurately counted since the amplitude and the waveform pattern of the signal waveform Sw differ depending on the user.

Patent Document 1: Japanese Unexamined Patent Publication No. 2003-290175

DISCLOSURE OF THE INVENTION

Problems to be Solved by the Invention

In light of the foregoing problems, it is an object of the present invention to provide a number-of-step detection system, a number-of-step detecting method, and an activity meter capable of accurately detecting the number of steps in correspondence with the walking characteristics of an individual.

Means for Solving the Problem

In accordance with an aspect of the present invention, there is provided a number-of-step detection system including a vibration data acquiring means for acquiring vibration data obtained by detecting vibration caused by body motion, and a storage means for storing walking waveform data based on the vibration data and feature waveform data for discriminating the walking waveform data, the number-of-step detection system including: a calculation means for executing a decision criterion data creating process for creating number-of-step decision criterion data suited for measuring number of steps based on the vibration data; the storage means for storing the number-of-step decision criterion data calculated by the calculation means; and a control means for controlling the vibration data acquiring means, the storage means, and the calculation means, wherein a number-of-step calculation process of calculating the number of steps from the vibration data by using the number-of-step decision criterion data is executed by the control means; the number-of-step decision criterion data stored in the storage means is updated to the number-of-step decision criterion data calculated by the control means; and the storage means is configured to store feature waveform data or pattern of the vibration data by walking; and the decision criterion data creating process includes acquiring the vibration pattern data that matches the feature waveform data from the vibration data, and creating the number-of-step decision criterion data that becomes a criterion in the number-of-step decision based on a local maximal value and a local minimal value of the vibration pattern data.

Therefore, the number of steps can be accurately detected in correspondence with the walking characteristics of the individual.

Furthermore, the number-of-step decision criterion data corresponding to the walking characteristics of the individual can be created.

In the above aspect, the number-of-step decision criterion data is configured by an upper threshold value or a threshold value for detecting the local maximal value, a lower threshold value or a threshold value for detecting the local minimal value, a time threshold value or a threshold value of a time interval from the local maximal value to a next local maximal value, or a plurality thereof.

Therefore, when the local maximal value and/or the local minimal value of the detected walking waveform data exceeds the upper threshold value and/or the lower threshold value of the number-of-step decision criterion data stored in the storage means, it can be detected as the number of steps. Furthermore, when the time threshold value from the local maximal value to the next local maximal value of the detected walking waveform data is in the time threshold value of the number-of-step decision criterion data stored in the storage means, it can be detected as the number of steps.

In the above aspect, the system further includes a display means for displaying specific reference adopting information indicating that number of steps is being detected based on the number-of-step decision criterion data calculated by the control means.

Therefore, it can be visually checked that the number of steps is being detected by using the decision criterion of the user individual.

In accordance with another aspect of the present invention, there is provided a number of step detecting method, including a vibration data acquiring means for acquiring vibration data obtained by detecting vibration caused by body motion, and a storage means for storing walking waveform data based on the vibration data and feature waveform data for discriminating the walking waveform data, the number-of-step detecting method including the steps of: executing with a calculation means a decision criterion data creating process for creating number-of-step decision criterion data suited for measuring number of steps based on the vibration data; storing the number-of-step decision criterion data calculated by the calculation means in the storage means; executing a number-of-step calculation process of calculating the number of steps from the vibration data by using the number-of-step decision criterion data by a control means for controlling the vibration data acquiring means, the storage means, and the calculation means, and updating the number-of-step decision criterion data stored in the storage means to the number-of-step decision criterion data calculated by the control means; wherein the storage means is configured to store feature waveform data or pattern of the vibration data by walking; and the decision criterion data creating process includes acquiring the vibration pattern data that matches the feature waveform data from the vibration data, and creating the number-of-step decision criterion data that becomes a criterion in the number-of-step decision based on a local maximal value and a local minimal value of the vibration pattern data.

Therefore, the number of steps can be accurately detected in correspondence with the walking characteristics of the individual.

Furthermore, the number-of-step decision criterion data corresponding to the walking characteristics of the individual can be created.

In the above another aspect, the number-of-step decision criterion data is configured by an upper threshold value or a threshold value for detecting the local maximal value, a lower threshold value or a threshold value for detecting the local minimal value, a time threshold value or a threshold value of a time interval from the local maximal value to a next local maximal value, or a plurality thereof.

Therefore, when the local maximal value and/or the local minimal value of the detected walking waveform data exceeds the upper threshold value and/or the lower threshold value of the number-of-step decision criterion data stored in the storage means, it can be detected as the number of steps. Furthermore, when the time threshold value from the local maximal value to the next local maximal value of the detected walking waveform data is in the time threshold value of the number-of-step decision criterion data stored in the storage means, it can be detected as the number of steps.

In the above another aspect, the method further includes the steps of: transmitting the vibration data acquired by the vibration data acquiring means from an activity meter including the vibration data acquiring means to a server including the calculation means with a communication means; transmitting the number-of-step decision criterion data calculated by the calculation means of the server from the server to the activity meter with the communication means; and updating the number-of-step decision criterion data stored in the activity meter to the number-of-step decision criterion data calculated in the server.

Therefore, the number-of-step decision criterion data stored in the activity meter can be updated in correspondence with the walking characteristics of the individual.

In the above another aspect, the method further includes the step of displaying with a display means specific reference adopting information indicating that number of steps is being detected based on the number-of-step decision criterion data calculated by the control means.

Therefore, it can be visually checked that the number of steps is being detected by using the decision criterion of the user individual.

In accordance with still another aspect of the present invention, there is provided an activity meter, including a vibration data acquiring means for acquiring vibration data obtained by detecting vibration caused by body motion, used in a number of step detection system, the activity meter including: a communication means for transmitting predetermined vibration data and receiving number-of-step decision criterion data based on the vibration data; wherein the correction means is configured to update number-of-step decision criterion data for determining the number of steps to the number-of-step decision criterion data received by the communication means; and the output means is configured to output the number of steps determined by the number-of-step decision criterion data after the update.

Therefore, the number of steps can be accurately detected in correspondence with the walking characteristics of the individual.

Effect of the Invention

According to the present invention, the number of steps can be accurately detected in correspondence with the walking characteristics of the individual.

BEST MODE FOR CARRYING OUT THE INVENTION

The present invention provides an activity meter including means for updating a reference for counting the number of steps in accordance with the number-of-step properties of the individual.

One embodiment of the present invention will be described below along with the drawings.

EXAMPLE

Figure 1:
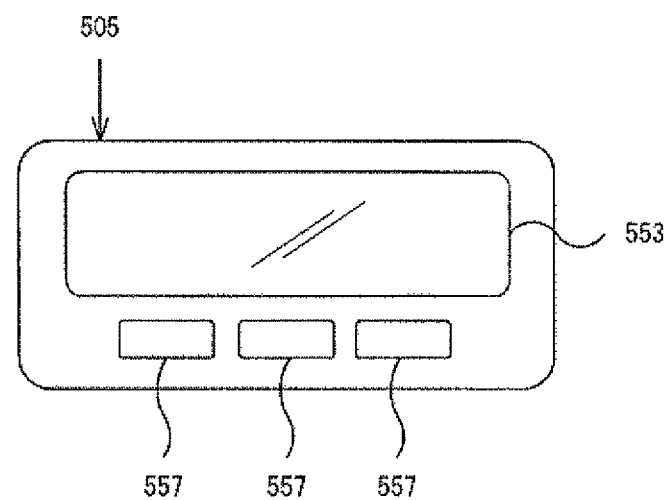
FIG. 1 is a front view showing an outer appearance of a pedometer.
Figure 2:
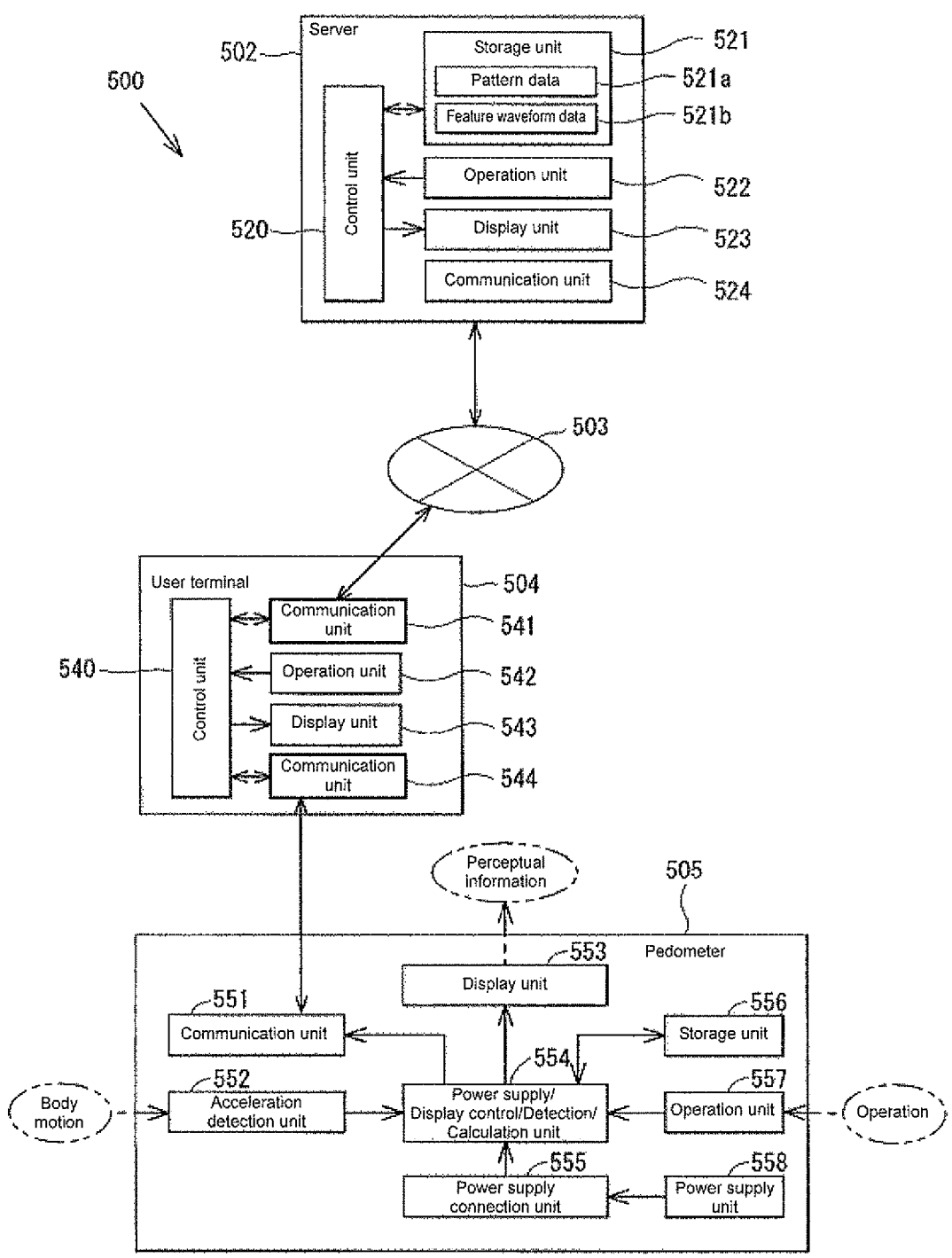
FIG. 2 is a block diagram showing a system configuration of a biological information acquiring system.

FIG. 1 is a front view showing an outer appearance of a pedometer 505, and FIG. 2 is a block diagram showing a system configuration of a biological information acquiring system.

A biological information acquiring system 500 is configured by a server 502 and a user terminal 504 connected by wire or wirelessly to an Internet 503, and a pedometer 505 connected by wire or wirelessly to the user terminal 504.

The server 502 is an appropriate computer used as a server device, or the like, and includes a control unit 520, a storage unit 521, an operation unit 522, a display unit 523, a communication unit 524, and the like.

The communication unit 524 is configured by an appropriate communication device such as a wire line connecting LAN board or a wirelessly communicating wireless LAN board.

The server 502 receives data from the pedometer 505 through the user terminal 504 and displays an output screen based on such data on the display unit 523 by the operation of the operation unit 522 by an attendant.

The user terminal 504 is configured by a personal computer, or the like, and includes a control unit 540, a communication unit 541 an operation unit 542, a display unit 543, a communication unit 544, and the like.

The communication unit 541 is configured by an appropriate communication device such as a wire line connecting LAN board or a wirelessly communicating wireless LAN board.

The communication unit 544 is configured by an appropriate communication interface such as a wire line connecting USB (Universal Serial Bus) or a wirelessly communicating Bluetooth (registered trademark).

The user terminal 504 has a function of acquiring data from the pedometer 505 through the communication unit 544 and displaying graphs and tables based on such data, and a function of transmitting such data to the server 502.

The user terminal 504 is not limited to a personal computer, and may be configured by an appropriate device such as being configured with a portable information processing device including a PDA (Personal Digital Assistants) and a portable telephone.

The pedometer 505 includes a communication unit 551, an acceleration detection unit 552, a display unit 553, a calculation unit 554, a power supply connection unit 555, a storage unit 556, an operation unit 557, and a power supply unit 658. The display unit 553 and the operation unit 557 are arranged on a front surface of a housing as illustrated.

The communication unit 551 is configured by an appropriate communication interface such as a wire line connecting USB (Universal Serial Bus) or a wirelessly communicating Bluetooth (registered trademark).

The acceleration detection unit 552 is a sensor for detecting acceleration as an example of change that occurs by walking etc, of the user, and transmits a detection signal to the calculation unit 554.

The acceleration detection unit 552 may be configured by a one-dimensional acceleration sensor for detecting acceleration in one direction, a two-dimensional acceleration sensor for detecting acceleration in two directions orthogonal to each other, or a three-dimensional acceleration sensor for detecting acceleration in three directions orthogonal to each other, where the three-dimensional acceleration having large amount of information is the most preferable.

The display unit 553 is configured by a display device such as a liquid crystal, and displays information according to a display control signal from the calculation unit 554. The information to display may be information related to walking such as number of steps.

The calculation unit 554 is driven by the power received from the power supply unit 558 through the power supply connection unit 555, and executes reception (detection) of the detection signal from the acceleration detection unit 552 and the operation unit 557, and the power supply (power supply) and the operation control (display control) with respect to the communication unit 551, the display unit 553 and the storage unit 556. The calculation unit 554 also executes a calculation process with reference to the walking decision criterion data etc. stored in the storage unit 556 based on the detection signal received from the acceleration detection unit 552.

The storage unit 556 stores a number-of-step count program for detecting the signal portion by walking in the detection signal and counting the number of steps, threshold data for counting the number of steps, and the like.

The operation unit 557 accepts appropriate operation input such as the input operation of the user information including weight and stride, the date and time input operation of setting the clock, the display content switching operation of switching the display content to various contents including number of steps, consumed calories, and walking distance, and the data transmitting operation of transmitting data to the user terminal 504, and transmits the operation input signal to the calculation unit 554.

Figure 3:
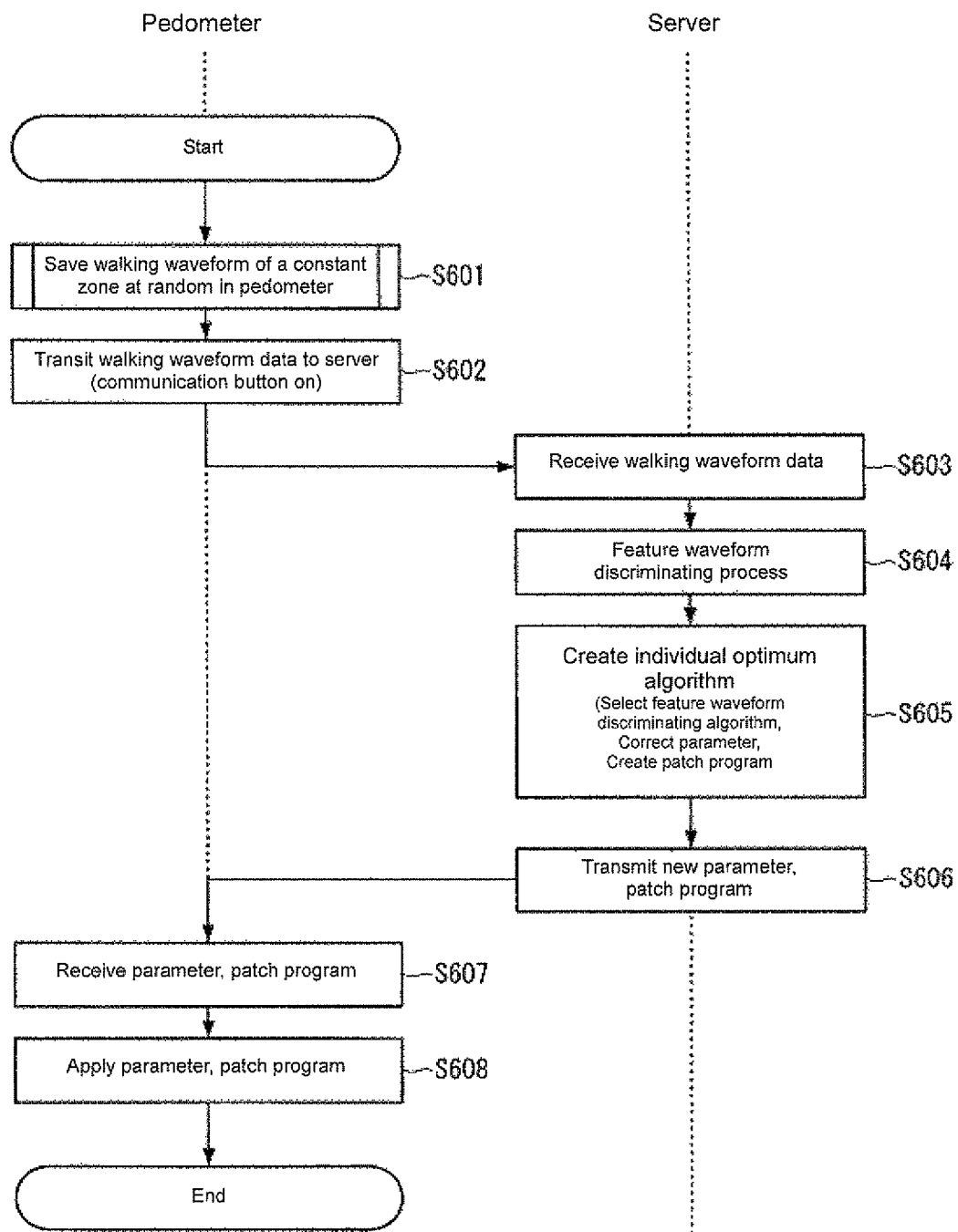
FIG. 3 is a flowchart of an operation of measuring the number of steps of the example.

FIG. 3 is a flowchart showing the operation in which the calculation unit 554 of the pedometer 505 and the control unit 520 of the server 502 measure the number of steps of the user.

The calculation unit 554 measures the walking waveform of a constant zone with the pedometer 505 and saves the same at random (step S601). The details on such random saving will be described later.

The calculation unit 554 transmits the walking waveform data saved at random to the server 502 (step S602). In this case, the communication button is turned ON by the operation of the operation unit 557 by the user, so that the walking waveform data is transmitted.

The control unit 520 of the server 502 receives the walking waveform data (step S603) and executes a feature waveform discriminating process (step S604).

Figure 6:
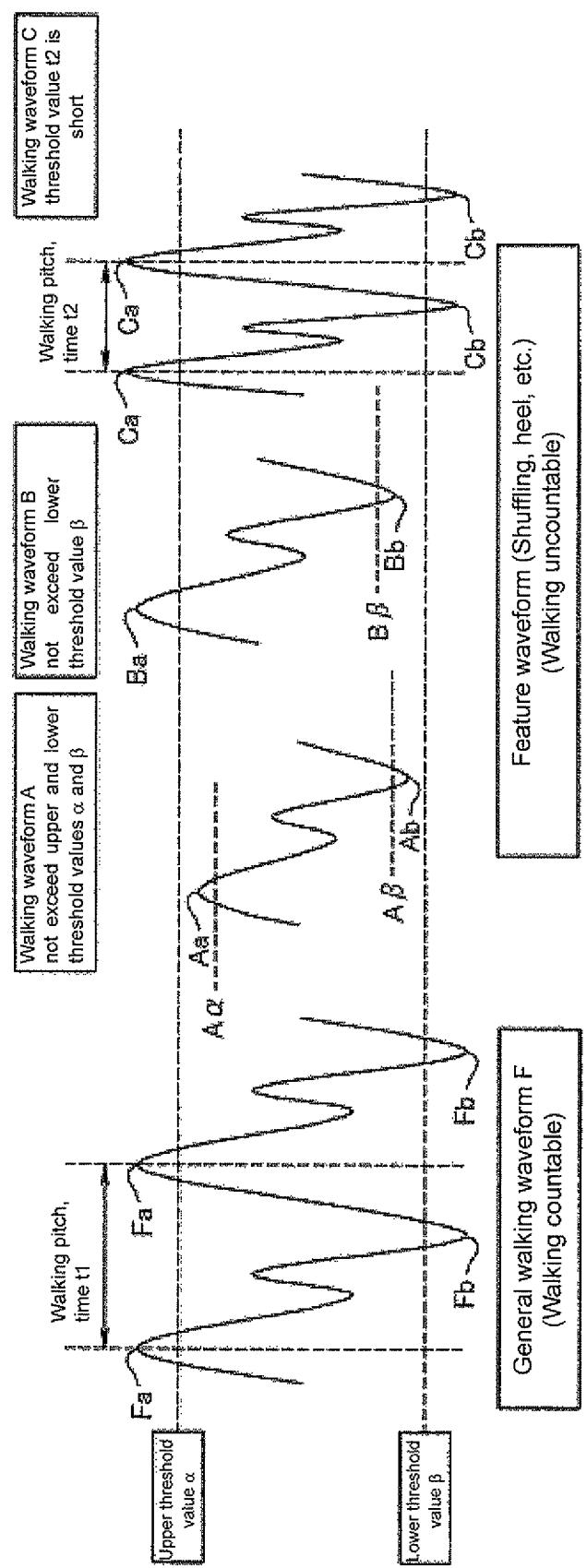
FIG. 6 is an explanatory view of a general walking waveform and a characteristic walking waveform.

The feature waveform discriminating process discriminates the feature based on a plurality of feature waveform algorithms registered in the database (storage unit 556 of server 502) (see FIG. 6).

Specifically, pattern recognition is carried out on a plurality of feature waveforms registered in the database (storage unit 556 of server 502) to discriminate whether the feature waveforms are alike (whether there are any having a matching degree of a certain degree or higher).

The control unit 520 executes the creation of an individual optimum algorithm (step S605). In this case, the control unit 520 executes the correction of the parameter and the provision of the patch program (update program).

Specifically describing, as shown in FIG. 6, when the number of steps of a general user is measured, the local maximal value Fa and the local minimal value Fb of the measured general walking waveform data F exceed an upper threshold value $\alpha$ and a lower threshold value $\beta$ of the number-of-step decision criterion data stored in the storage unit 556. The number of steps is thus correctly counted.

However, as opposed to the general walking, the local maximal value Aa and the local minimal value Ab of the measured walking waveform data A may not exceed the upper threshold value $\alpha$ and the lower threshold value $\beta$ stored in the storage unit 556 when the number of steps of the user carrying out the walking that becomes the feature waveform such as shuffling, walking with heels and the like is measured. The number of steps is then not carried out correctly.

The walking waveform data saved in the pedometer 505 is thus transmitted to the server 502, and the waveform of the walking is acquired through pattern recognition in the control unit 520. A value slightly lower than the local maximal value Aa of the walking waveform data A of the walking is calculated, and such value is stored as an upper threshold value A$\alpha$ for detecting the local maximal value Aa. A value slightly higher than the local minimal value Ab of the walking waveform data A is calculated, and such value is stored in the storage unit 521 as a lower threshold value A$\beta$ for detecting the local minimal value Ab.

The local maximal value Aa and the local minimal value Ab may be obtained by a predetermined calculation such as multiplying 0.9 to the average value of the local maximal value Aa and the local minimal value Ab.

The server 502 transmits the number-of-step decision criterion data including the upper threshold value A$\alpha$ and the lower threshold value A$\beta$ created by the control unit 520 to the pedometer 505.

The calculation unit 554 of the pedometer 505 receives the number-of-step decision criterion data of the user individual transmitted from the server 502, and stores the received number-of-step decision criterion data in the storage unit 556 as number-of-step decision criterion data for counting the number of steps of the user individual.

The local maximal value Aa and the local minimal value Ab of the walking waveform data A detected when measured with the pedometer 505 thus exceed the upper threshold value Aα and the lower threshold value Aβ of the number-of-step decision criterion data stored in the storage unit 556, so that the number of steps of the user individual can be reliably counted.

Furthermore, when the number of steps of the user carrying out walking of other feature waveforms is measured, and the local maximal value Ba of the measured walking waveform data B exceeds the upper threshold value α for detecting the local maximal value Ba stored in the storage unit 556 but the local minimal value Bb of the relevant walking waveform data B does not exceed the lower threshold value β for detecting the local minimal value Bb stored in the storage unit 556, the number of steps is not correctly counted.

When the number of steps of the general user is measured, a walking pitch time t2 from the local maximal value Fa of the measured walking waveform data F to the next local maximal value Fa is within a predetermined range of a walking pitch time t1 from the local maximal value Fa of the general walking waveform data F stored in the storage unit 556 to the next local maximal value Fa, and thus it is counted as the number of steps.

However, when the number of steps of the user with a short stride carrying out walking of other feature waveforms is measured, a walking pitch time t2 from the local maximal value Ca of the measured walking waveform data C to the next local maximal value Ca is not within a predetermined range of the walking pitch time t1 if shorter or longer than a walking pitch time t1 from the local maximal value Fa to the next local minimal value Fb of the general walking waveform data F stored in the storage unit 556, and thus it is not counted as the number of steps.

The walking waveform data C saved in the pedometer 505 is then transmitted to the server 502, the walking pitch time t2 from the local maximal value Ca of the walking waveform data C to the local maximal value Ca is calculated in the control unit 520, and such walking pitch time t2 is stored in the storage unit 521 as the number-of-step decision criterion data for detecting the walking pitch interval.

Thereafter, the number-of-step decision criterion data created in the control unit 520 is transmitted to the pedometer 505 as parameter and patch program.

The correction of the parameter provides the parameter value of the feature waveform algorithm (discriminated as having high matching degree in step S604) registered in the database.

Alternatively, the parameter is corrected for individuals from the walking waveform data and the parameter value of the feature waveform algorithm of the database. In this case, an appropriate parameter may be estimated through methods such as maximum likelihood estimation.

The provision of the patch program may provide the algorithm for determining the specific feature waveform. For instance, that of a different idea from that adopted in the current pedometer may be provided.

This different idea may be to add a new threshold value (parameter) to the algorithm, or to reduce one part of the current threshold value to specialize in the discrimination of the feature waveform.

The control unit 520 transmits the new parameter and the patch program to the pedometer 505 (step S606).

The calculation unit 554 of the pedometer 505 receives the parameter and the patch program (step S607), applies the received parameter and the patch program (step S608), and terminates the process.

The number of steps thus can be subsequently counted with the received parameter and the patch program.

Figure 4:
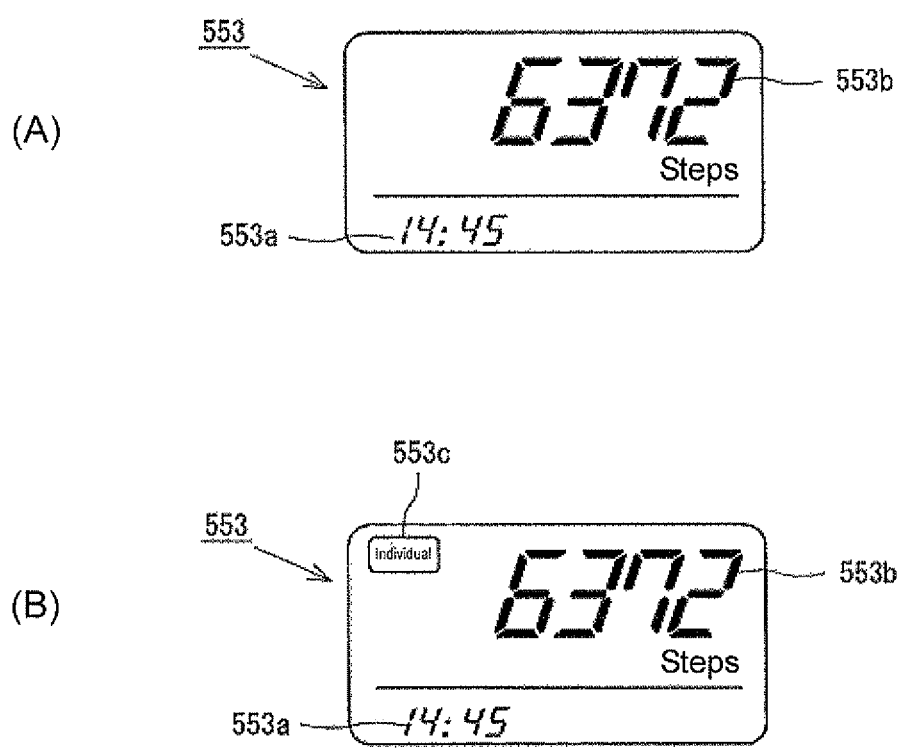
FIGS. 4A and 4B are front views showing the display content of the display unit displayed at the time of measurement of the number of steps.

Specifically describing, the time 553a at the time of measurement and the number of steps 553b of the user are displayed on the display unit 553 of the pedometer 505 when measuring the number of steps of the general user, as shown in FIG. 4A. However, when the parameter and the patch program corresponding to the walking characteristics of the user individual are applied, the character or the individual 553c indicating that the update data set for the individual is being used is further displayed on the display unit 553 of the pedometer 505.

It can be visually checked that the number of steps of the user individual is being measured based on the updated data for the individual.

Figure 5:
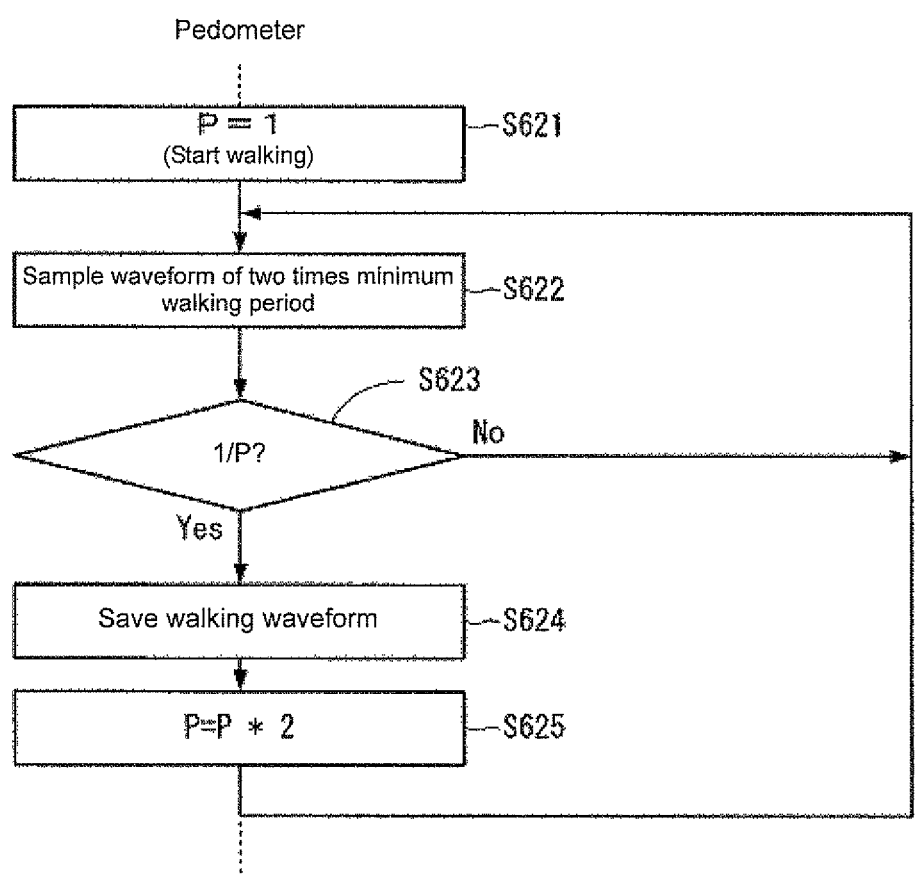
FIG. 5 is a flowchart showing the operation of saving the walking waveform at random.

FIG. 5 is a flowchart showing the operation of the calculation unit 554 of the pedometer 505 for executing the random saving of the walking waveform.

The calculation unit 554 substitutes 1 to the variable P at the start of walking (step S621), and samples the waveform of two times the minimum walking period (step S622).

The calculation unit 554 determines whether or not to save the sampling data at the probability of 1/P (step S623), and does not save the walking waveform if not corresponding to the probability 1/P (step S623: No), and returns the process to step S622.

If corresponding to the probability 1/P (step S623: Yes), the calculation unit 554 saves the walking waveform (step S624), substitutes a value in which 2 is multiplied to the variable P (step S625), and returns the process to step S622 and repeats the processes.

As described above, the pedometer 505 includes a communication means (communication unit 551) for transmitting a predetermined vibration data (acceleration data saved at random), and receiving the number-of-step decision criterion data (parameter and patch program) based on the vibration data, where the correction means (calculation unit 554 for executing the step S608) has a configuration adapted to update the number-of-step decision criterion data for determining the number of steps to the number-of-step decision criterion data received by the communication means, and the output means (display unit 553) has a configuration adapted to output the number of steps determined by the number-of-step decision criterion data after the update, so that the algorithm suited for the user individual can be downloaded to count the number of steps.

As the transmission of predetermined vibration data is executed at a random timing, the memory amount of the pedometer 505 does not need to be greatly increased, the communication amount can be reduced, and the optimum algorithm can be efficiently selected.

In the biological information acquiring system 500, the server 502 includes a communication means (communication unit 551) for communicating with the pedometer 505, a storage means (storage unit 521) for storing a plurality of types of feature waveform data 521b, and a control means (control unit 520) for performing various types of controls, where the control means executes the vibration data receiving process (step S603) for receiving the vibration data from the pedometer 505 by the communication means, the pattern matching process (step S604) for pattern matching to check which feature waveform data 521b the received vibration data is close to, and the decision criterion data creating process (step S605) for creating the new decision criterion data in correspondence with the pattern data 521a obtained by matching to automatically create the algorithm (parameter, patch program) corresponding to the properties of the user.

The randomness is completely maintained since whether to save or not is determined only with the probability value. Thus, all the walking waveforms do not need to be stored, and the amount of data to save can be reduced.

The memory capacity can be saved since the waveform data to be saved is saved at a proportion corresponding to the walking feature of the user. In other words, the proportion of walking at the feature waveform differs depending on the user such as the user who mostly carries out walking of the normal waveform and sometimes carries out walking of the feature waveform, or the user who always carries out walking of the feature waveform originally with shuffling.

On the contrary, the waveform data is updated by being randomly saved, so that update is sometimes carried out on the user in which the feature waveform sometimes appears, and the update is frequently carried out on the user in which the normal waveform and the feature waveform are frequently interchanged.

In the correspondence of the configuration of the present invention and the above described embodiment, a number of step determining system of the present invention corresponds to the biological information acquiring system 500 of the example, and similarly, a vibration data acquiring means, a decision criterion data creating means, and a calculation means correspond to the calculation unit 554, an activity meter corresponds to the pedometer 505, a control means corresponds to the control unit 520, a communication means corresponds to the communication units 524, 551, an output means and a display means correspond to the display unit 553, a specific reference adopting information corresponds to the individual 553c, a storage means corresponds to the storage units 521, 556, and vibration pattern data corresponds to the walking waveform data A and the walking waveform data B, but the present invention is not limited only to the configuration of the above described embodiment, and a great number of embodiments may be obtained.

For instance, a plurality of examples described above may be connected by the Internet 503. The pedometer 505 thus can be appropriately cooperated.

The pedometer 505 may be configured to be expanded with the function by downloading an appropriate parameter, threshold value, algorithm, or the like from the server 502. In this case, the software may be version upgraded with the hardware as is, or it may be easily optimized to the user himself/herself.

The function expansion of the pedometer 505 may be configured to be executed from the user terminal 504 without using the server 502. In this case, a configuration of downloading the parameter, the threshold value, the algorithm, and the like from the recording medium such as the CD-ROM may be adopted.

The pedometer 505 may communicably connect such devices directly wirelessly or by wire. In this case as well, the data may be mutually transmitted and received to enhance each accuracy.

Industrial Applicability

The present invention can be used in a device for detecting body motion and counting the number of steps such as the pedometer and the activity meter.

DESCRIPTION OF SYMBOLS

500 biological information acquiring system
502 server
505 pedometer
520 control unit
521, 556 storage unit
524, 551 communication unit
552 acceleration detection unit
523, 553 display unit
554 calculation unit
522, 557 operation unit

The invention claimed is:

1. A number-of-step detection system comprising:
a vibration data acquiring unit that acquires vibration data obtained by detecting vibration caused by body motion, and a storage unit that stores walking waveform data based on the vibration data and feature waveform data for discriminating the walking waveform data;
a calculation unit that executes a decision criterion data creating process for creating number-of-step decision criterion data suited for measuring number of steps based on the vibration data;
the storage unit stores the number-of-step decision criterion data calculated by the calculation unit; and
a control unit that controls the vibration data acquiring unit, the storage unit, and the calculation unit, wherein
a number-of-step calculation process of calculating the number of steps from the vibration data by using the number-of-step decision criterion data is executed by the control unit;
the number-of-step decision criterion data stored in the storage unit is updated to the number-of-step decision criterion data calculated by the control unit;
the storage unit is configured to store, responsive to user movement, a plurality of the feature waveform data corresponding to a movement characteristic of a user; and
the decision criterion data creating process includes matching acquired walking waveform data to a similar one of the plurality of feature waveform data stored in the storage unit, and creating the number-of-step decision criterion data that becomes a criterion in the number-of-step decision based on a local maximal value and a local minimal value of the walking waveform data which corresponds to the one of the plurality of feature waveform data.

2. The number-of-step detection system according to claim 1, wherein the number-of-step decision criterion data is configured by an upper threshold value or a threshold value for detecting the local maximal value, a lower threshold value or a threshold value for detecting the local minimal value, a time threshold value or a threshold value of a time interval from the local maximal value to a next local maximal value, or a plurality thereof.

3. An activity meter including a vibration data acquiring unit that acquires vibration data obtained by detecting vibration caused by body motion, and is used in a number of step detection system according to claim 2, the activity meter comprising:
a communication unit for transmitting predetermined vibration data and receives number-of-step decision criterion data based on the vibration data; wherein
the correction unit is configured to update number-of-step decision criterion data for determining the number of steps to the number-of-step decision criterion data received by the communication unit; and the output unit is configured to output the number of steps determined by the number-of-step decision criterion data after the update.

4. The number-of-step detection system according to claim 1, further comprising a display unit that displays specific reference adopting information indicating that number of steps is being detected based on the number-of-step decision criterion data calculated by the control unit.

5. An activity meter including a vibration data acquiring unit that acquires vibration data obtained by detecting vibration caused by body motion, and is used in a number of step detection system according to claim 4, the activity meter comprising:
  a communication unit that transmits predetermined vibration data and receiving number-of-step decision criterion data based on the vibration data; wherein
  the correction unit is configured to update number-of-step decision criterion data for determining the number of steps to the number-of-step decision criterion data received by the communication unit; and
  the output unit is configured to output the number of steps determined by the number-of-step decision criterion data after the update.

6. An activity meter including a vibration data acquiring unit that acquires vibration data obtained by detecting vibration caused by body motion, and is used in a number of step detection system according to claim 1, the activity meter comprising:
  a communication unit that transmits predetermined vibration data and receives number-of-step decision criterion data based on the vibration data; wherein
  the correction unit is configured to update number-of-step decision criterion data for determining the number of steps to the number-of-step decision criterion data received by the communication unit; and
  the output unit is configured to output the number of steps determined by the number-of-step decision criterion data after the update.

7. A number of step detecting comprising the steps of:
  acquiring vibration data obtained by detecting vibration caused by body motion by a vibration data acquiring unit, and storing walking waveform data based on the vibration data and feature waveform data for discriminating the walking waveform data in a storage unit;
  executing with a calculation unit a decision criterion data creating process for creating number-of-step decision criterion data suited for measuring number of steps based on the vibration data;
  storing the number-of-step decision criterion data calculated by the calculation unit in the storage unit;
  executing a number-of-step calculation process of calculating the number of steps from the vibration data by using the number-of-step decision criterion data by a control unit for controlling the vibration data acquiring unit, the storage unit, and the calculation unit, and
  updating the number-of-step decision criterion data stored in the storage unit to the number-of-step decision criterion data calculated by the control unit; wherein
  the storage unit is configured to store. responsive to user movement, a plurality of feature waveform data corresponding to a movement characteristic of a user; and
  the decision criterion data creating process includes matching acquired walking waveform data to a similar one of the plurality of the feature waveform data stored in the storage unit, and creating the number-of-step decision criterion data that becomes a criterion in the number-of-step decision based on a local maximal value and a local minimal value of the walking waveform data which corresponds to the one of the plurality of feature waveform data.

8. The number-of-step detecting method according to claim 7, wherein the number-of-step decision criterion data is configured by an upper threshold value or a threshold value for detecting the local maximal value, a lower threshold value or a threshold value for detecting the local minimal value, a time threshold value or a threshold value of a time interval from the local maximal value to a next local maximal value, or a plurality thereof.

9. The number of step detecting method according to claim 7, further comprising the steps of:
  transmitting the vibration data acquired by the vibration data acquiring unit from an activity meter including the vibration data acquiring unit to a server including the calculation unit with a communication unit;
  transmitting the number-of-step decision criterion data calculated by the calculation unit of the server from the server to the activity meter with the communication unit; and
  updating the number-of-step decision criterion data stored in the activity meter to the number-of-step decision criterion data calculated in the server.

10. The number-of-step detecting method according to claim 7, further comprising the step of displaying with a display unit specific reference adopting information indicating that number of steps is being detected based on the number-of-step decision criterion data calculated by the control unit.

* * * * *